(12) United States Patent
Lach

(10) Patent No.: US 6,366,344 B1
(45) Date of Patent: Apr. 2, 2002

(54) DUAL BEAM LASER SIGHTING AID FOR ARCHERY BOWS

(76) Inventor: Jerry W. Lach, 2630 State Rd. 120 E, Fremont, IN (US) 46737

( * ) Notice: Subject to any disclaimer, the term of this patent is extended or adjusted under 35 U.S.C. 154(b) by 0 days.

(21) Appl. No.: 09/619,592

(22) Filed: Jul. 19, 2000

Related U.S. Application Data

(63) Continuation-in-part of application No. 09/267,036, filed on Mar. 12, 1999, now abandoned.

(51) Int. Cl.$^7$ .............................. G01C 3/00; F41G 1/00
(52) U.S. Cl. .......................................... 356/3.1; 33/265
(58) Field of Search ............................. 33/265; 356/3.1

(56) References Cited

U.S. PATENT DOCUMENTS

| | | |
|---|---|---|
| 2,376,836 A | 5/1945 | Tunnicliffe |
| 2,547,232 A | 4/1951 | Schwartz et al. |
| 4,313,272 A | 2/1982 | Matthews |
| 4,753,528 A | 6/1988 | Hines et al. |
| 4,939,863 A | 7/1990 | Alexander et al. |
| 5,355,609 A | 10/1994 | Schenke |
| 5,419,050 A | 5/1995 | Moore |
| 5,495,675 A | 3/1996 | Huang |
| 5,598,972 A | 2/1997 | Klein, II et al. |
| 5,782,002 A | 7/1998 | Reed |

OTHER PUBLICATIONS

Larry Wise, The Comprehensive Guide to Equipment, Technique, and Competition Bow and Arrow, Publisher: Stackpole Books, Harrisburg, PA, USA.

*Primary Examiner*—Stephen C. Buczinski
(74) *Attorney, Agent, or Firm*—Paul W. O'Malley; Susan L. Firestone

(57) ABSTRACT

The present invention provides a target illuminating and sighting apparatus for a bow. A frame for attachment to the bow supports two vertically spaced pivoting mounts, each of mounts supports a laser oriented to illuminate a target when the bow is aimed. Cams abut the pivotal mounts and allow for setting an angle of vertical convergence between the light beams so that the lasers intersect at ranges of between about 10 and 50 yards. An inclination cam, working synchronously with the convergence cam controls the inclination of the beams relative to the initial path of an arrow to be shot from the bow. The inclination cam may be calibrated to adjust for the particular bow and arrow combination.

19 Claims, 5 Drawing Sheets

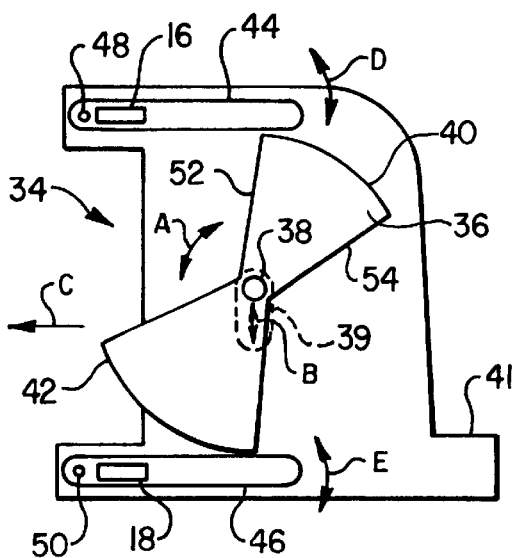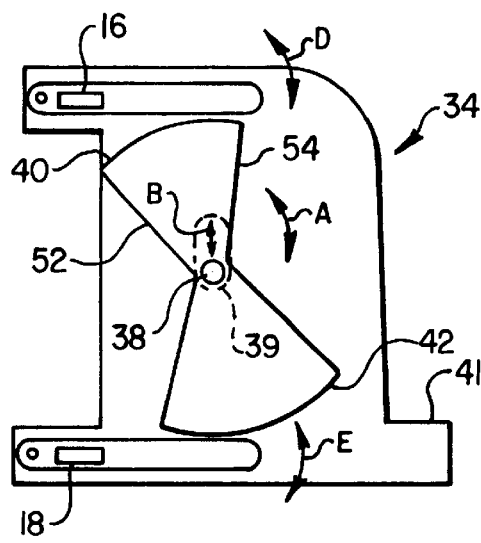
FIG. 2A   FIG. 2B
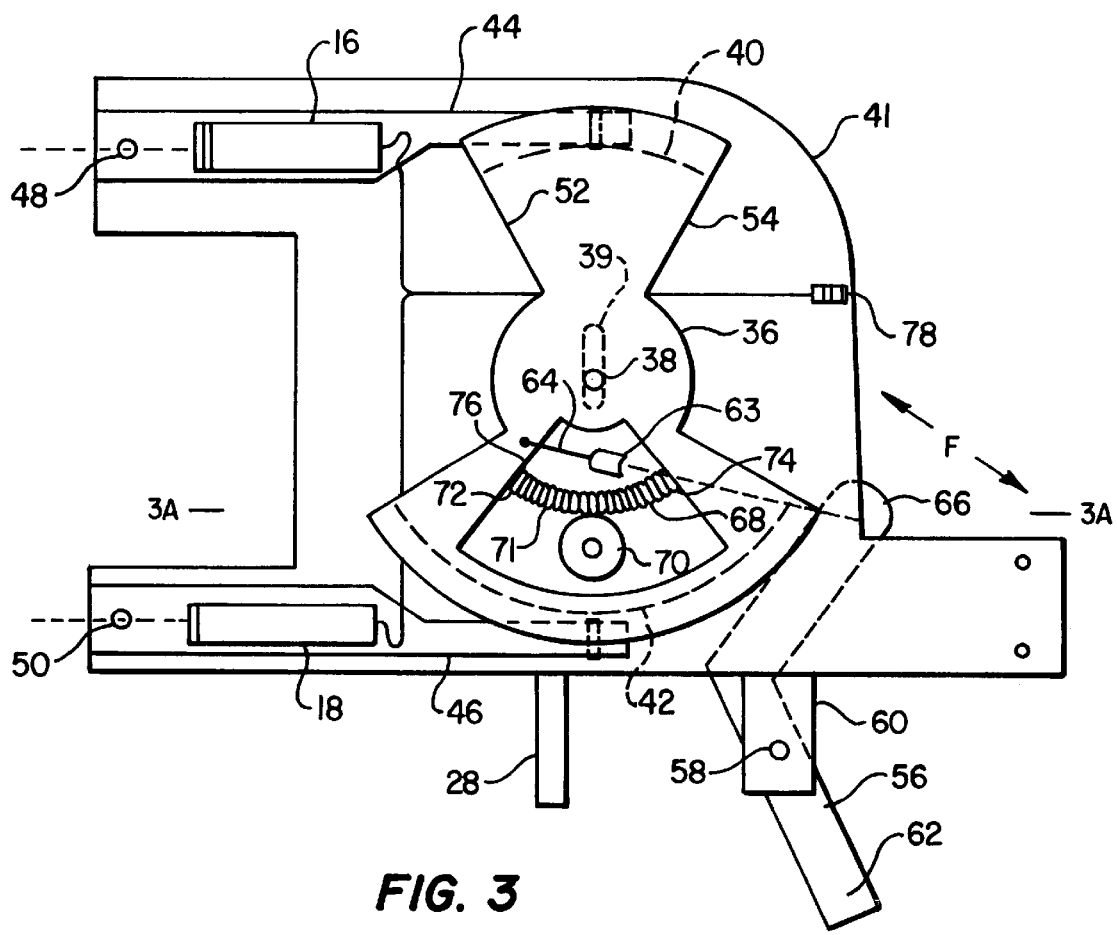
FIG. 3

DUAL BEAM LASER SIGHTING AID FOR ARCHERY BOWS

This is a continuation-in-part application of application Ser. No. 09/267,036 filed Mar. 12, 1999, now abandoned.

BACKGROUND OF THE INVENTION

1. Field of the Invention

The present invention relates to archery and more particularly to bow sights. Still more particularly the invention relates to a dual beam laser targeting aid providing synchronized control of convergence and inclination of the beams for guiding bow elevation prior to shooting.

2. Description of the Problem

Arrow flight is an example of ballistic dynamics. Pure ballistic dynamics deals with the trajectory of projectiles which generate no lift and have no continuing source of thrust. Ballistics considers the effects of gravitational fields and allows for aerodynamic drag. Under these conditions projectiles follow a decaying parabolic trajectory with the rate of velocity decay being highest where the velocity is greatest. Accordingly, bow archery has never been a matter of simply taking careful aim directly at a target and loosing the bowstring to send an arrow toward its mark. As long as the archer is not shooting vertically, the archer must estimate the range to the mark in order to give the arrow an initial upward velocity relative to his or her line of sight to the mark. The archer does this by elevating the bow to aim the arrow above the mark.

The degree to which the archer elevates the bow is complicated by a number of factors. An archer is trained to shoot from a full draw. For a given bow, a fill draw transfers a fixed amount of energy to the bow which is transferred to the arrow upon loosing the bowstring. Thus, a heavier (more massive) arrow will accelerate less than a lighter (less massive) arrow. An arrow with a larger arrowhead or fetching another arrow will generate correspndingly more drag at a given velocity, contributing to a greater decay in velocity. An archer compensates for all of these factors when elevating a bow for a shot.

Archers have long used sights to help aim arrows. Given the differing flight characteristics of arrows and the different energy capacity of different bows, a bowsight will typically be matched to a bow and arrow combination. Lasers have been extensively applied to improve the effectiveness of sights, particularly with respect to estimating the proper elevation of the bow. U.S. Pat. No. 5,782,002 to Reed and U.S. Pat. No. 5,495,675 to Huang are good examples. Both patents teach bowsights incorporating a laser. The laser is oriented to emit its light beam in the direction of arrow flight from the bow. In both patents the laser is positioned above the arrow rest and the inclination of the laser can be adjusted so that the beam illuminates the desired mark when the archer has elevated the bow to compensate for the archer's estimated range to target. Reed provides a cam based adjustment mechanism for setting laser inclination. However, the effectiveness of the Reed and Huang devices depends upon the archer's correct in situ estimation of the range to the mark and a correct estimation of the arrow's trajectory.

Laser sights exist for actually measuring range, such as Hines et al., U.S. Pat. No. 4,753,528. The Hines' device is an electronic range finder incorporating a laser and a photosensitive detector for sampling reflected light. Such devices are illegal for hunting in several States and are not permitted at contests under applicable archery competition rules. It remains a problem to supply a bow sight which will guide an archer in correctly elevating his or her bow for hitting a mark without actively measuring the range to the target.

SUMMARY OF THE INVENTION

It is an object of the present invention to provide a laser bowsight aid which guides an archer in correctly elevating the bow to hit a mark with an arrow shot from the bow.

It is another object of the present invention to provide an adjustable bowsight aid which may be calibrated for arrows of differing flight characteristics and bows of differing energy capacities.

It is still another object of the present invention to provide bowsight aid which is light, robust and compact.

The present invention provides a sighting aid for use primarily with a short range, low projectile velocity weapon, preferably an archery bow. The sight comprises projectors for light beams, preferably provided by two lasers. In the preferred embodiment, both lasers are positioned, vertically aligned, above the arrow rest of the bow. The lasers are oriented to direct their beams in the general direction of flight of an arrow to be shot from the bow. The lasers are mounted on pivoting arms, diverging slightly outwardly from the vertical plane of the bow. The arms pivot on axes perpendicular to the plane of the bow, allowing the inclination of the lasers relative to the direction of arrow flight, and relative to one another, to be adjusted. The levers ride on the perimeter cam surfaces of a rotatable cam wheel. Convergence of the lasers is controlled by giving one of the perimeter cam surfaces a variable radius, while the second lever rides against a constant radius cam surface. Thus the angle of convergence of the lasers changes as the cam wheel rotates. The range to convergence of the beams is a fixed function of cam wheel position. The inclination of the two lasers is synchronously controlled by raising and lowering the cam wheel. This is done by providing a second, variable radius cam mounted on the cam wheel which rides against a brace fixed to a frame supporting the wheel. As the cam wheel rotates, the height of the cam wheel varies as a function of its radial position as different sections of the variable radius cam come into position on the fixed brace. The second variable radius cam, or declination control cam, is user adjustable, so that the degree of declination of the lasers for a given cam wheel position may be changed and may be calibrated with the range to convergence of the beams for the cam wheel position.

In use, the laser sighting aid produces two horizontally aligned illuminated dots on the target when the bow is correctly elevated. To effect this result, the convergence of the laser beams and the declination of the laser beams is calibrated. As described above, the trajectory of an arrow shot from a bow is a decaying parabola. Every point in the trajectory of the arrow will lie below a straight line projection of the arrow's initial direction of flight. Lasers positioned with one above the other, and with both lasers above, but vertically aligned with, an arrow resting in the bow, can be oriented (with a declination) to intercept one another (converge) to intercept the arrow's trajectory at a single point. With the ranges to convergence of the laser beams fixed as a function of cam wheel position, the declination of the lasers for each cam wheel position is adjusted to intercept the expected trajectory for an arrow by adjusting the declination control cam.

Typically, declination of the beams is calibrated for the ranges to convergence of the beams by trial and error. The declination control cam is step wise adjustable, based on a series of radially spaced, independently adjustable allen screws. An archer calibrates the system for a particular bow and arrow combination by taking aim at a series of targets, spaced to correspond to the changes in range to convergence for each available step in the declination control cam. Declination is adjusted at each range until the archer achieves consistent hits at the proper height for the range to target.

Additional effects, features and advantages will be apparent in the written description that follows.

BRIEF DESCRIPTION OF THE DRAWINGS

FIGS. 2A and 2B are schematic illustrations of a preferred embodiment of the invention;

FIG. 3 is a side cross sectional view of a preferred embodiment of the invention;

DETAILED DESCRIPTION OF THE INVENTION

Figure 1:
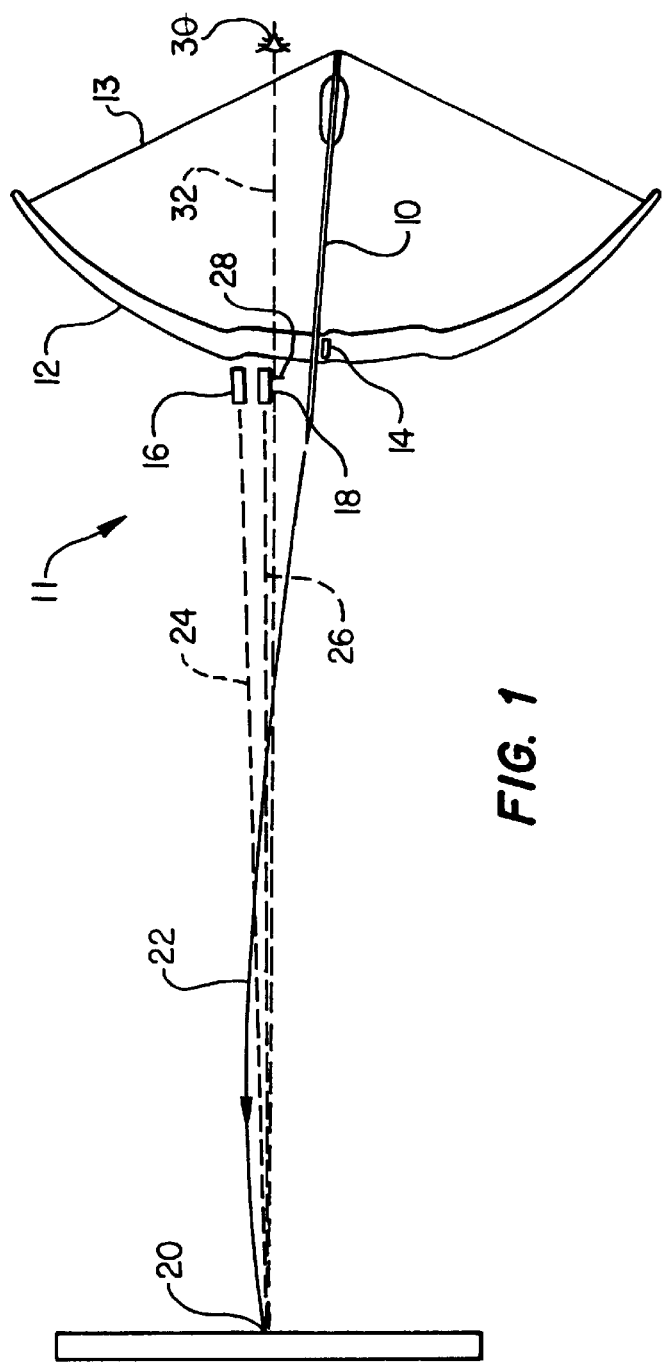
FIG. 1 is a schematic illustration of the principal of the invention applied to a ballistic trajectory for an arrow.

Referring now to the drawings in which like numerals refer to like objects in different views, FIG. 1 schematically illustrates the environment of application of the invention. An arrow 10 shot from bow 12 has a ballistic trajectory 22. For a non-vertical shot, trajectory 22 is a roughly parabolic track, bending downwardly due to gravity, with the downward tract accentuated by the effects of drag on the forward velocity of the arrow. For an archer 30 to hit mark 20, arrow 10 must be launched with an upward velocity component, compared to the line of sight 32 to the mark, to compensate for gravity and drag. Archer 30 does this by elevating bow 12, relative to the line of sight 32, before loosing bowstring 13. The present invention guides the archer in correctly elevating bow 12 for hitting mark 20 without actively measuring the range to the mark.

Target illuminating apparatus 11 comprises first and second lasers 16 and 18, positioned with respect to bow 12 to be vertically aligned with arrow rest 14. Lasers 16 and 18 are oriented to project beams 24 and 26 toward mark 20. Lasers 16 and 18 are oriented so that beams 24 and 26 vertically converge at the range to mark 20 and have a declination with respect to the initial arrow trajectory 22 that the point of convergence corresponds to the point that arrow 10 will hit, assuming no cross wind condition exists. The range to convergence of beams 24 and 26 and the relative inclinations of the beams to the rest inclination of arrow 10 on arrow rest 14 are controlled by archer 30. Convergence and inclination are synchronously adjusted by a cam mechanism of the preferred embodiment, in which the inclinations of lasers 16 and 18 are pre-calibrated for the anticipated trajectory of the arrow 10 for a plurality of ranges to convergence. In use, an archer 30 aligns and elevates bow 12 along a line of sight 32 established through a simple sight 28 while synchronously adjusting the inclination and convergence of lasers 16 and 18 until beams 24 and 26 are horizontally aligned on mark 20.

FIGS. 2A and 2B are schematic illustrations of the principals of operation of a cam mechanism 34 used to implement a preferred embodiment of the invention. Cam mechanism 34 is shown at the ends of its travel, with FIG. 2A corresponding to positioning of the cam for distant targets, up to a range of 45 to 50 yards, and FIG. 2B illustrating positioning of the cam for near ranges of about 10 yards. The precise ranges available will depend upon the ballistic trajectory characteristics of the arrow, the energy capacity of the bow and the dimensions of the cam mechanism. Nothing in principal limits the application of the invention to bows or to ranges under 50 yards, but the use of bows at greater ranges is not generally recommended.

Figure 5:
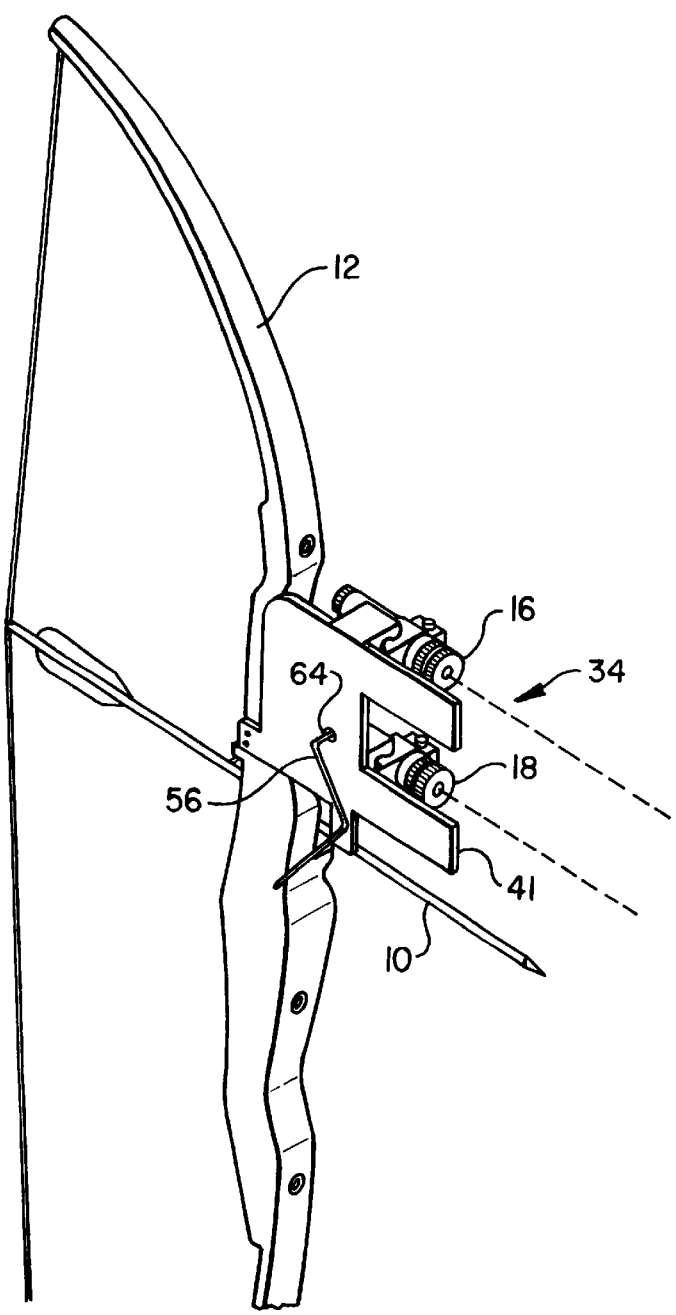
FIG. 5 is a perspective view of a first embodiment of the invention mounted to an archery bow.

Cam mechanism 34 is based on a frame 41 adapted for mounting on a bow (shown in FIG. 5). A cam wheel 36 is rotatably mounted on an axis 38 which in turn is set in a vertical slot 39 in frame 41. Cam wheel 36 can, accordingly, rotate on axis 38 as indicated by double arrow "A" as well as move upwardly and downwardly as indicated by double arrow "B". The mechanism for synchronizing rotation with up and down movement of cam wheel 36 is discussed below. For distant targets cam wheel 36 is rotated clockwise to the maximum extent of its travel and raised. For near targets cam wheel 36 is rotated counterclockwise to the maximum extent of its travel and lowered.

Cam wheel 36 has an upper cam surface 40 and a lower cam surface 42, against which upper lever 44 and lower lever 46 ride. At least one of cam surfaces 40 and 42 has a radially varying radius on axis 38. As a result, when cam wheel 36 is rotated, the pitch of one of levers 44 and 46 changes as a result of riding on a cam surface which has a varying radius. In the preferred embodiment, upper cam surface 40 varies between a maximum radius and a minimum radius on axis 38, while the radius of lower cam surface 42 is constant. By varying the radius of only one cam surface machining costs are reduced and greater tolerances are obtained. In the preferred embodiment, the maximum and minimum radii of upper cam surface 40 are both greater than the constant radius of lower cam surface 42. The radii of the laser cam surface is sufficiently large to assure that levers 44 and 46 assure relative pitches which assures that beams from lasers 16 and 18 converge. The largest, or most open, convergence angle between beams emitted by lasers 16 and 18 occurs when cam wheel 36 is rotated so that upper cam surface 40 abuts lever 44 along its minimum radius 52. This cam wheel 36 position is used for the maximum effective range for the bow and correspondents FIG. 2A. The smallest, or most closed convergence angle, used for near marks, is obtained when upper cam surface 40 abuts lever 44 at the point of its greatest radius 54 as illustrated in FIG. 2B. The ranges to convergence of the beams is a function of the radial position of cam wheel 36.

Where both lasers are to be positioned above the arrow, and levers 44 and 46 are essentially identical, the greater radii for upper cam surface 40 assure that the upper more laser 16 has a greater declination to the horizontal than laser 18. Cam wheel 36 can be constructed to provide a setting where there was no convergence of the beams. Such a setting would be advantageous where the sight is to be used for vertical shots. The variation in the radii for upper cam surface 40 is less than 2% of the average diameter of cam wheel 36. The precise measurements depend on the absolute magnitude of the diameter of cam wheel 36.

The pitches of levers 44 and 46 are also changed by the upward and downward movement of cam wheel 36. In the preferred embodiment, cam mechanism 34 is positioned on a bow above the arrow rest 14. Thus both laser 16 and 18 are above the arrow, relative to gravity, and both must point downwardly relative to the initial path of the arrow in order to intercept the anticipated trajectory of the arrow. As an arrow's trajectory will follow a increasingly downward arc, relative to the horizontal distance being traversed, the arrow is fired above a target which is at substantially the same level as the archer. The inclination, or more precisely speaking, declanation of lasers 16 and 18 relative to the initial path of an arrow is set by the upward and downward movement of the axis 39 of cam wheel 36 in slot 38. As described below, the position of axis 38 in slot 39 automatically changes with rotation of cam wheel 36, synchronizing changes in laser declination with changes in the convergence angle between lasers 16 and 18.

Upper lever 44 is mounted to pivot on axis 48 and lower lever 46 is mounted to pivot on axis 50, both of which axes extend from frame 41 and are located at the opposite end of where the levers contact the cam wheel 36. Lasers 16 and 18 are mounted on upper lever 44 and lower lever 46, respectively, and are oriented to cast their beams in the forward direction indicated generally by arrow "C". As cam wheel 36 rotates, upper lever 44 pitches relatively up or down as generally indicated by double arrow "D" stemming from both movement up and down of cam wheel 36 and the change in radius of cam surface 40 while lower lever 46 pitches as indicated by double arrow "E" movement of cam surface 42 up and down with movement of the cam wheel. Axes 48 and 50 may be spring biased (not shown) to assure that levers 44 and 46 ride snugly against cam wheel 36. Levers 44 and 46 are substantially identical otherwise. Under zero wind conditions, and as long as changes in atmospheric density have a negligible effect on aerodynamic drag of the arrow, an arrow shot from a properly drawn and elevated bow will cross the level of the mark when it reaches the range to the mark. If a laser guide mounted to the bow has the correct declination, the beam from the laser will strike the mark at the correct level for a correctly elevated bow. By synchronizing and calibrating the declinations of beams from lasers 16 and 18 with the changing range to convergence of the beams, the archer will no longer have to estimate the range to the target or mark. By rotating cam wheel 36 until the beams converge on the target, he or she will automatically have set the declination of the lasers to the correct angle to illuminate the target when the bow is elevated to the proper degree.

FIG. 3 is a side cross section of the preferred embodiment particularly illustrating the mechanism of synchronizing control of cam wheel 36 elevation with rotational position of the cam wheel 36 on frame 41. A lever 56 is centered and rotationally mounted on a pin 58 extending downward from frame extension 60. When frame 41 is correctly aligned and mounted on a bow (shown in FIG. 5) lever 56 is positioned so that an archer can reach and move the lever from its lower end 62 in the directions indicated by double arrow "F". Lever 56 extends behind frame 41 and is attached to cam wheel 36 by a semi-rigid guide wire 64. Guide wire 64 passes through an opening 63 from the back to front side of frame 41 and attaches to cam wheel 36 at a point on the cam wheel spaced from the central axis 38. Movement of lever 56 causes tension or pressure to be applied to cam wheel 36 along guide wire 64, resulting in cam wheel 36 rotating on axis 38.

Cam wheel 36 includes a height control cam 68, which is positioned in an arc located partway between the central axis 38 of the cam wheel and the fixed radius cam surface 42. Height control cam 68 rides on a free wheeling pinion 70 mounted on frame 41. Since axis 38 can move up and down in slot 39, cam wheel 36 has a maximum elevation on frame 41 when the radius of height control cam 68 is at its maximum and, similarly, the cam wheel has a minimum elevation on frame 41 when the radius of the height control cam is at its minimum.

Height control cam 68 comprises a plurality of allen screws 71 set along the arc of a fixed radius arch 76 in cam wheel 36. Allen screws 71 are independently adjustable to provide a series of step height adjustments particular rotational positions of cam 36. As previously discussed, the convergence angle between lasers 16 and 18 will be greatest (i.e. most open) at a maximum allowed range for the bow. For shots at the maximum range for a bow, the greatest bow elevation will be required, guided by bringing the declination of lasers 16 and 18 to a relative maximum. Accordingly, the height of cam wheel 36 will be set for its highest relative position for the rotational position of cam wheel 36 which brings the minimum radius portion 52 of cam surface 40 into contact with upper lever 44. That is, the rotational position of cam wheel 36 which pushes convergence of the beams from lasers 16 and 18 out to the maximum allowed range also sets the declination for both lasers to a maximum. Correspondingly, the allen screws 71 at the position radially corresponding to the maximum radius portion 54 of cam surface 40 will be set at a relative minimum to minimize the declination of lasers 16 and 18. The precise settings for each allen screw 71 are determined by trial and error. To calibrate height control cam 68 an archer uses a target at each of a plurality of desired ranges. For each target, cam wheel 36 is positioned to bring the twin light beams into convergence for the range to the target. The declination of the lasers is then adjusted by adjusting the alien screw 71 which rides on free wheeling pinion 70 for the rotational angle of cam wheel 36 which produces convergence. The declination setting is correct when the archer consistently obtains the correct bow elevation for hitting the target. Setting the alien screw 71 at end 74 of height control cam 68 higher than all of the remaining allen screws will give cam 68 its maximum radius at end 74 and the greatest declination to the lasers for distant targets. For a nearby target, where the range to convergence of the beams from lasers 16 and 18 is at its minimum, introduced by declination control 21 cam 68, the declination of the lasers is minimized.

Lasers 16 and 18 may be actuated by a three position switch 78 and a replaceable battery (not shown). Switch 78 (will include) includes off and on settings, and may include an "automatic" setting which activates the lasers only when bow 12 is substantially fully drawn. Providing an automatic setting may be provided by use of a strain gauge (not shown) or other device attached to the bow for detecting drawing of the bow string 13. A site 28 extends from the bottom of frame 41.

Figure 3A:
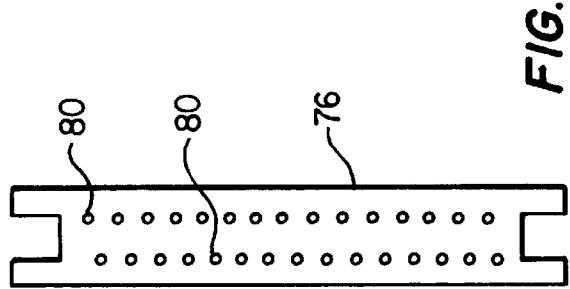
FIG. 3A is a partial section view taken along section lines -3A- in FIG. 3.

FIG. 3A illustrates arch 76 in greater detail. Openings 80 for allen screws 71 are set in two staggered rows. The radial displacement of the screws 71 around the arch is about 3 degrees, corresponding to approximately 2 yard intervals in range.

Figure 4A:
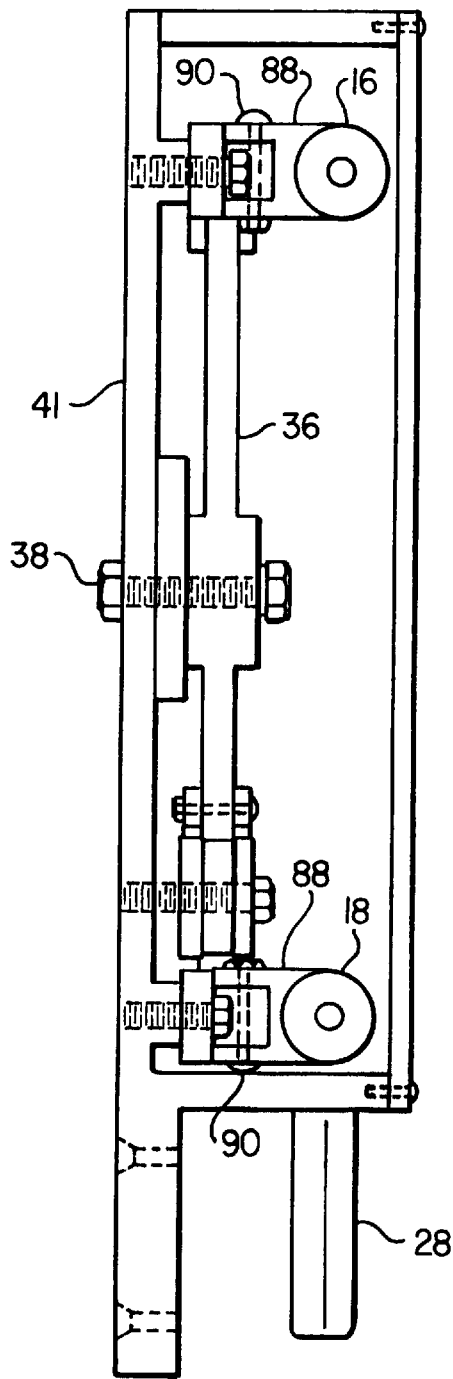
FIG. 4A is a cross sectional view of a first embodiment of the invention viewed from the front.
Figure 4B:
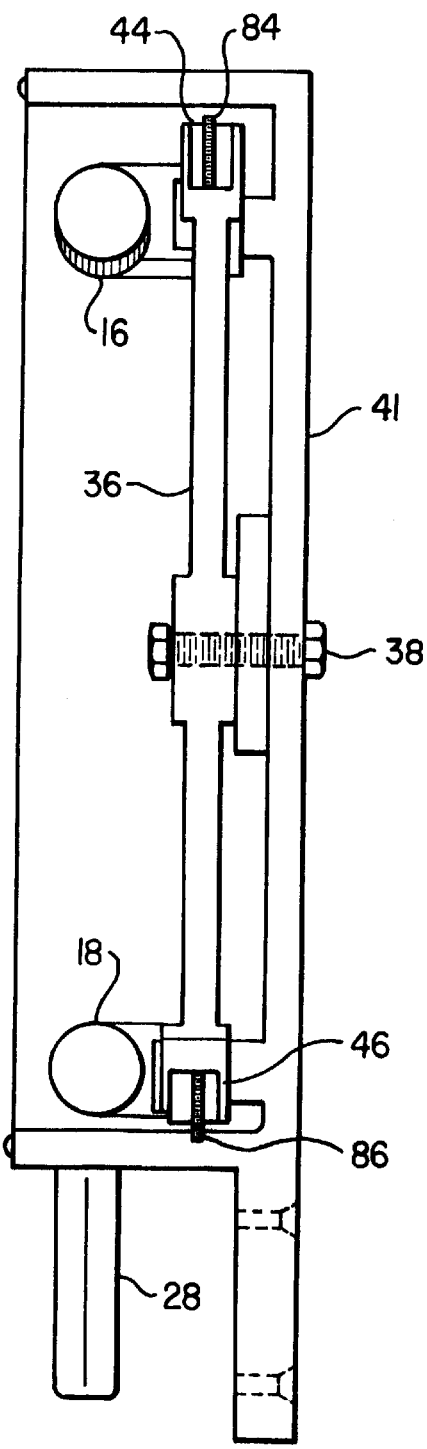
FIG. 4B is a cross sectional view of a first embodiment of the invention viewed from the rear.

FIGS. 4A and 4B illustrate additional details of construction of the dual beam targeting aid of the present invention, particularly details of the mounting of cam wheel 36 on frame 41. Additionally, the mounting of lasers 16 and 18 and their relative positioning to sight 14 are shown. Lasers 16 and 18 are held in substantially identical mounts 88 which depend from levers 44 and 46. Mounts 88 are locked by screws 90 once the desired degree of horizontal divergence has been introduced to the lasers 16 and 18. The vertical convergence of lasers 16 and 18 may is adjusted by the positioning of screws 84 and 86, which pass through the ends of levers 44 and 46 respectively to ride on the cam surfaces of cam wheel 36.

Lastly, FIG. 5 is a perspective view illustrating positioning of frame 41 and the cam mechanism 34 on bow 12. As described above, lasers 16 and 18 as well as sight 14 are vertically aligned with arrow 10. Frame 41 is positioned on bow 12 above arrow 10 to bring cam adjusting lever 56 within easy reach of the fingers of the hand gripping bow 12. This allows the archer to adjust the declination of lasers 16 and 18 while simultaneously changing the elevation of bow 12.

Figure 7:
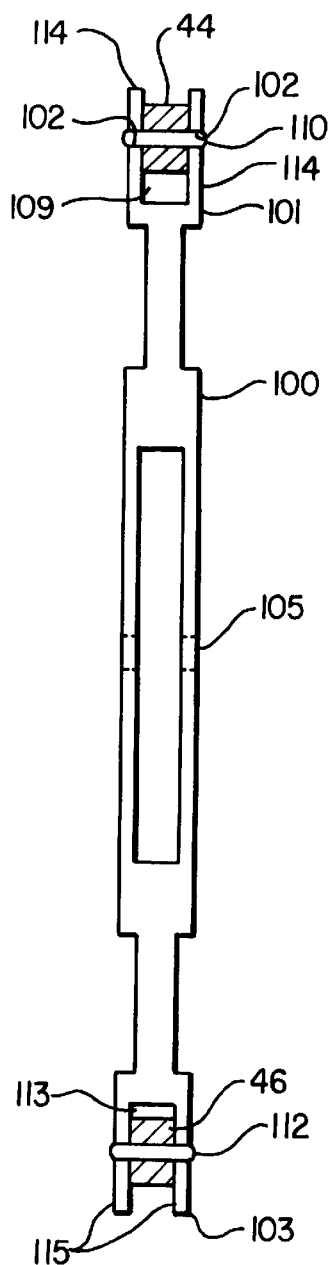
FIG. 7 is a cross sectional view taken along section lines 7—7 of FIG. 6.
Figure 6:
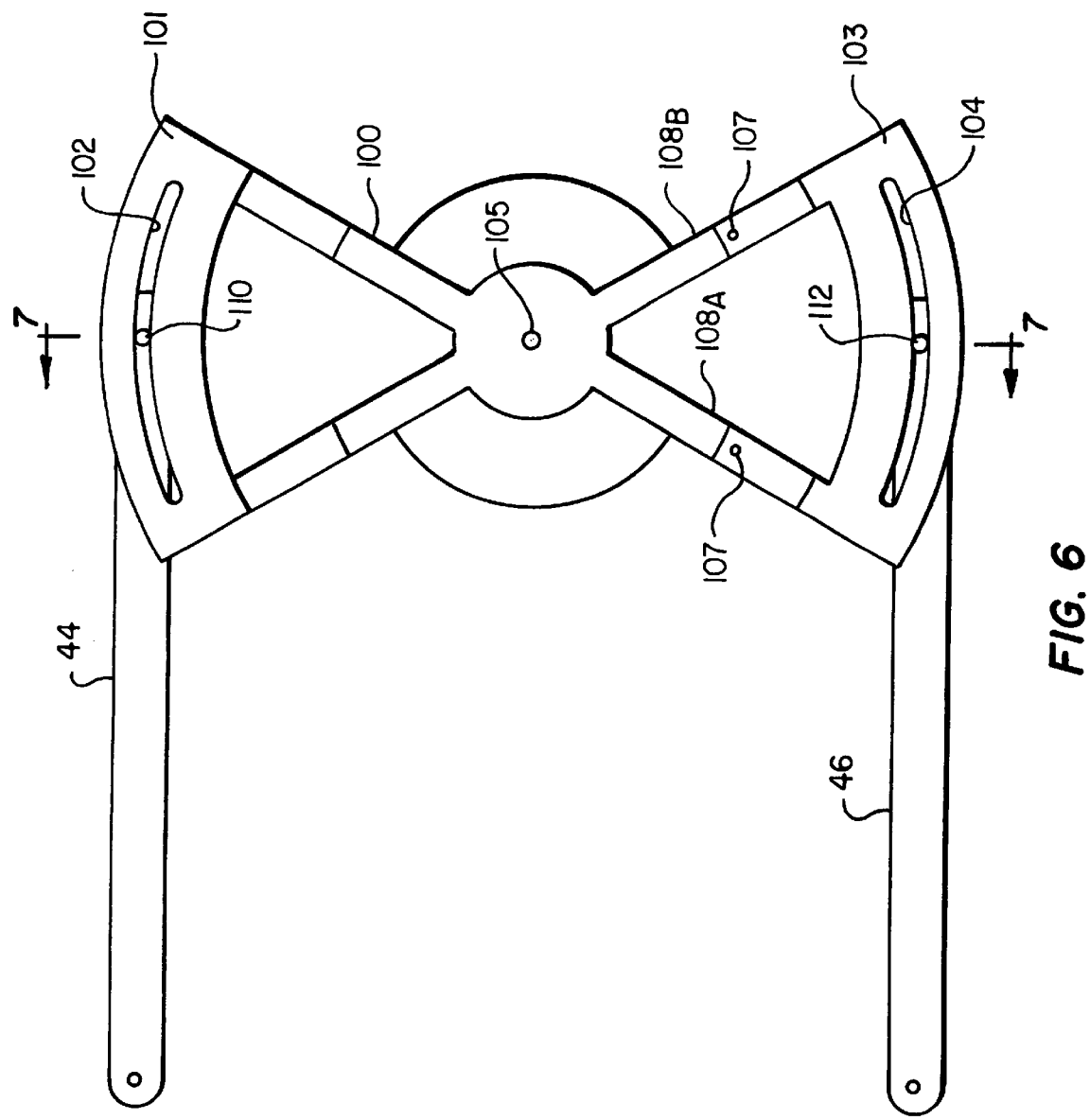
FIG. 6 is a side elevation of an alternative, preferred cam wheel.

FIGS. 6 and 7 illustrate an alternative, preferred embodiment of the invention incorporating an improved cam wheel 100. The declination adjustment apparatus is unchanged and illustration of that aspect of the mechanism is omitted for the sake of brevity. A height control cam 68 may be attached between arms 108A and 108B using mounting points 107 through the arms.

Cam wheel 100 is rotatable on axis 105 which is centered in the cam wheel. Levers 44 and 46 are attached to the rim sections 101 and 103, respectively, of the cam wheel by pin studs 110 and 112. The free end of lever 44 is inserted into a slot 109 cut into rim section 101 for the outside perimeter. Lever 44 is positioned by a pin stud 110 which is positioned through lever 44 to engage outside slot 102 in the outside walls. Slots 102 are arcs which are centered on axis 105 but which have a varying radius on the axis as a fraction of radial position. The variable radius slots 102 allow changing the angle of convergence of levers 44 and 46.

Similarly, lever 46 is inserted in a slot 113 formed by the art walls of rim section 103. A stud pin 112 inserted through lever 46 perpendicular to its direction of elongation engages parallel circular section slots 104 cut in through the outer walls 115. Pin studs 110 and 112 fit snugly in the slots to provide highly controlled positions of levers 44 and 46.

The present invention provides a bowsight with a laser targeting aid which guides an archer's elevation of a bow to illuminate a target when the bow is held at the correct elevation. The device may be readily calibrated to compensate for arrows of differing mass and air resistance. The bowsight aid itself is light weight, robust and compact. While the preferred embodiment uses two laser sources, those skilled in the art will now realize that a single laser, a beam splitter and other appropriate optics could be substituted for using laser sources.

While the invention is shown in only one of its forms, it is not thus limited but is susceptible to various changes and modifications without departing from the spirit and scope of the invention.

What is claimed is:

1. Target illuminating apparatus for a projectile launcher, comprising:
   first and second light projectors mounted on the projectile launcher and oriented to project first and second light beams on substantially converging paths with one another in a vertical plane and vertically aligned with an anticipated initial trajectory for a projectile to be shot from the projectile launcher;
   a convergence controller cooperating with the first and second light projectors for setting a distance to convergence of the first and second light beams; and
   an inclination controller for adjusting angles of inclination for the first and second light projectors relative to the anticipated initial trajectory of the projectile to project the first and second light beams onto a target at the level of anticipated impact of the projectile.

2. Target illuminating apparatus as claimed in claim 1, wherein the convergence controller comprises first and second cams which rotate to set the distance to convergence of the first and second light beams and the inclination controller includes a cams vertical positioner which adjusts the vertical position of the first and second cams synchronously with the rotation of the cams to change the angles of inclination of the first and second light beams relative to the initial trajectory of the first and second light beams.

3. Target illuminating apparatus as claimed in claim 2, further comprising:
   calibration settings in the inclination controller to adjust for projectiles of differing ballistic characteristics and for different projectile launchers.

4. Target illuminating apparatus as claimed in claim 3, wherein the projectile launcher is a bow.

5. Target illuminating apparatus as claimed in claim 4, further comprising:
   a frame for mounting on the bow; and
   the first and second light projectors having first and second pivoting mountings depending from the frame and positioned on the frame to be vertically spaced relative to the bow.

6. Target illuminating apparatus as set forth in claim 5, further comprimising:
   a radially positionable wheel mounted on the frame;
   the first and second cams being positioned on the radially positionable wheel for engaging the first and second pivoting mountings for changing the relative convergence orientation of the first and second pivoting mountings with respect to another;
   the inclination controller having a stepped height adjustment cam positioned on the radially positionable wheel providing vertical positioning of the radially positionable wheel to set inclination for the first and second pivoting mountings; and
   a plurality of independently adjustable steps in the stepped height adjustment cam allowing independent calibration of the inclination settings for a plurality of ranges to convergence.

7. Target illuminating apparatus as set forth in claim 6, wherein the first and second light projectors further comprise at least a first source of laser light.

8. Target illuminating apparatus as set forth in claim 6, wherein the first and second light projectors include lasers.

9. A target illuminating and sighting apparatus for a bow having an arrow rest, comprising:
   a frame for attachment to the bow;
   first and second pivotal mounts depending from the frame to be vertically displaced from one another with respect to the bow;
   a first projector positioned on the first pivotal mount;
   a second projector positioned on the second pivotal mount;
   the first and second projectors being oriented to project light beams forward from the bow toward a target;
   cam means engaging at least a first of the pivotal mounts for setting an angle of vertical convergence for the light beams from the first projector and the second projector; and
   an inclination adjustment module coupled to the first and second pivotal mounts for adjusting angles of inclination relative to the arrow rest for the light beams projected by the first and second projectors.

10. A target illuminating and sighting apparatus as claimed in claim 9, wherein the cam means are repositioned by the inclination adjustment module.

11. A target illuminating and sighting apparatus as claimed in claim 10, further comprising:

means for calibrating the inclination adjustment module.

12. A target illuminating and sighting apparatus as claimed in claim 11, further comprising:

a lever pivotally mounted to the frame for actuating the cam means and the inclination adjustment module.

13. A target illuminating and sighting apparatus as claimed in claim 12, wherein the lever is manipulable by fingers of a hand gripping the bow.

14. A target illuminating and sighting apparatus as claimed in claim 13, further comprising:

the cam means including a cam wheel with a vertically displaceable axis of rotation on the frame, the cam surfaces being centered on the axis of rotation and contacting the first and second pivotal mounts; and the inclination adjustment module including a inclination adjustment cam positioned on the cam wheel for positioning the axis of rotation of the cam wheel upon rotation of the cam wheel.

15. A target illuminating and sighting apparatus as claimed in claim 14, wherein the inclination adjustment cam is stepped from a plurality of independently height adjustable screws radially spaced around the cam for use at various ranges.

16. A target illuminating and sighting apparatus as claimed in claim 15, wherein the first and second pivotal mounts orient the first and second projectors to cast beams which diverge horizontally.

17. A target illuminating and sighting apparatus as claimed in claim 16, further comprising at least a first source of laser light for the first and second projectors.

18. Target illuminating apparatus as set forth in claim 16, wherein the first and second projectors are lasers.

19. Apparatus for aiming a low velocity projectile following a ballistic trajectory, comprising:

first and second projectors for first and second light beams on paths which are vertically substantially aligned with a projected path for the projectile and initially vertically displaced from one another;

first and second convergence control cams linked to the first and second projectors for orienting the first and second light beams to converge at a variety of ranges;

a cam displacement mechanism for vertically positioning the first and second convergence control cams for setting declinations of the first and second light beams relative to the initial path of the projectile to indicate vertical decay in the trajectory of the projectile out to the variety of ranges of first and second light beam convergence; and a plurality of adjustment settings for the cam displacement mechanism to allow a user to set declinations for changes in ballistic situations.

* * * * *